United States Patent

Hirano et al.

[11] Patent Number: 5,930,530
[45] Date of Patent: *Jul. 27, 1999

[54] VIBRATION REDUCTION DEVICE

[75] Inventors: Shinichi Hirano, Utsunomiya; Hitoshi Takeuchi, Fujisawa, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/942,152

[22] Filed: Oct. 1, 1997

Related U.S. Application Data

[63] Continuation of application No. 08/707,428, Sep. 5, 1996, abandoned.

[30] Foreign Application Priority Data

Sep. 6, 1995 [JP] Japan .................................. 7-229006
Sep. 8, 1995 [JP] Japan .................................. 7-230866

[51] Int. Cl.⁶ .................................................. G03B 17/00
[52] U.S. Cl. ................................................ 396/53; 396/52
[58] Field of Search .............................. 396/52, 53, 54, 396/55; 348/206

[56] References Cited

U.S. PATENT DOCUMENTS

| | | | |
|---|---|---|---|
| 5,192,964 | 3/1993 | Shinohara et al. | 396/55 |
| 5,218,442 | 6/1993 | Hamada et al. | 348/208 |
| 5,237,365 | 8/1993 | Miyazawa | 396/49 |
| 5,266,981 | 11/1993 | Hamada et al. | 396/55 |
| 5,319,456 | 6/1994 | Nishida et al. | 348/699 |
| 5,365,303 | 11/1994 | Yamasaki et al. | 396/53 |
| 5,369,462 | 11/1994 | Miyazawa et al. | 396/54 |
| 5,416,554 | 5/1995 | Hamada et al. | 396/52 |
| 5,420,661 | 5/1995 | Hamada et al. | 396/55 |
| 5,510,856 | 4/1996 | Jung | 348/699 |
| 5,576,788 | 11/1996 | Miyazawa et al. | 396/52 |

*Primary Examiner*—Russell Adams

[57] ABSTRACT

A vibration reduction device includes a vibration detection unit for detecting nonlinear vibrations of the optical axis in an image taking optical system of an image taking apparatus, a vibration reduction drive unit for moving some or all components of the image taking optical system relative to the image taking frame of the image taking apparatus, and a vibration reduction control unit for extracting regularity from the time series detection outputs from the vibration detection unit, predicting the time series output waveform of the vibration on the basis of the extracted regularity, and driving the vibration reduction drive unit on the basis of the prediction result.

8 Claims, 8 Drawing Sheets

VIBRATION REDUCTION DEVICE

This application is a continuation of application Ser. No. 08/707,428, filed Sep. 5, 1996, now abandoned.

BACKGROUND OF THE INVENTION

1. Field of the Invention

The present invention relates to a vibration reduction device for reducing nonlinear vibrations of the optical axis in an image taking optical system of an image taking apparatus.

2. Related Background Art

Conventionally, an AF device is popularly equipped in an image taking apparatus represented by a camera, and it is also proposed to add a vibration reduction device for reducing vibrations caused by camera shake to the image taking apparatus.

The vibration reduction device is built in the image taking apparatus, detects angular variations of the optical axis due to, e.g., camera shake, and corrects the image to be taken on the basis of the detection result. For example, Japanese Laid-Open Patent Application No. 2-66535 discloses a vibration reduction device applied to a single-element lens optical system, and Japanese Laid-Open Patent Application No. 2-183217 discloses an example wherein the image to be taken is corrected by moving some components of an image taking optical system in an inner-focus type telescopic lens.

In such vibration reduction devices, the moving amount of a vibration reduction mechanism is calculated on the basis of the detection result of the vibration amount by an appropriate means, and the vibration reduction device is moved on the basis of the calculation result. For this reason, a time lag is generated between the detection timing of the vibration amount and the calculation end timing. Hence, the vibration amount can be reduced to some extent, but such reduction operation always results in insufficient reduction.

In view of this problem, in recent years, means for minimizing the time lag have been proposed. For example, Japanese Laid-Open Patent Application No. 3-65935 proposes an invention in which an accelerometer is arranged in a vibration reduction optical system, and a calculation result after an elapse of (calculation time+response time) from the acceleration detection timing as the start point is predicted, and describes that fuzzy reasoning is used for attaining high-speed calculations.

On the other hand, Japanese Laid-Open Patent Application No. 5-40291 proposes an invention in which prediction calculations are performed on the basis of vibration reduction optical system movement data and vibration change amount data at a plurality of timings separated by given intervals so as to obtain vibration reduction data at the drive timing of a vibration reduction optical system, and vibration reduction is effectively performed in correspondence with the obtained data.

The prior art proposed by Japanese Laid-Open Patent Application Nos. 3-65935, 5-40291, and the like perform short-term prediction of vibrations under the assumption that the generated vibrations have some linearity.

In practice, however, vibrations are generated associated with the image taking apparatus holding operation of a photographer, and are nonlinear. For this reason, the prediction precision of vibration reduction is low even in short-term prediction, resulting in low vibration reduction precision.

In the prior art, the detection timing of vibration information such as an acceleration is used as the start point, and calculations are performed after this detection so as to predict vibrations. For this reason, the time required for calculations is indispensable, and a certain time lag cannot be eliminated. From this point of view as well, the prediction precision of vibration reduction is low.

SUMMARY OF THE INVENTION

A vibration reduction apparatus according to the present invention comprises a vibration detection unit for detecting a nonlinear vibration of an optical axis in an image taking optical system of an image taking apparatus, a vibration reduction drive unit for moving some or all components of the image taking optical system relative to an image taking frame of the image taking apparatus, and a vibration reduction control unit for extracting regularity from time series detection outputs from the vibration detection unit, predicting a time series output waveform of the vibration on the basis of the extracted regularity, and driving the vibration reduction drive unit on the basis of a result of the prediction.

According to one mode of the present invention, in the vibration reduction device, the vibration reduction control unit reconstructs an attractor by embedding the time series detection outputs in a multi-dimensional state space, and predicts the time series output waveform on the basis of data vectors of the reconstructed attractor.

Furthermore, in the vibration reduction device, at least two vectors closest to the latest vector may be extracted from the data vectors of the attractor, and a weighted mean of the extracted vectors is calculated using, as weighting coefficients, values corresponding to distances from the extracted vectors to the latest vector, so as to calculate a predicted vector.

In the above-mentioned vibration reduction device, the time series detection outputs from the vibration detection unit are considered as time series data that behave chaotically, and an attractor is reconstructed by embedding the time series detection outputs from the vibration detection unit in a multi-dimensional state space using calculation coefficients (delay time and embedding dimension) as fixed values on the basis of the so-called Takens embedding theorem. The short-term prediction of the time series output waveform is performed on the basis of data vectors of the reconstructed attractor, and a vibration reduction signal for the vibration reduction drive unit is generated on the basis of the short-term prediction result and the time series detection outputs from the vibration detection unit, so as to control the vibration reduction device. With this control, a phase lag due to the delay time from generation of actual vibrations until execution of vibration reduction control can be compensated for with high precision in a broad vibration frequency region, thus attaining high-precision vibration reduction.

The vibration reduction device of the present invention described above is advantageous as compared to the conventional device. However, as a result of thorough examinations, the present inventors found that, since the vibration reduction device according to this proposal used predetermined fixed values as the calculation coefficients (delay time and embedding dimension) which were to be used upon reconstruction of the attractor by embedding the time series detection outputs from the vibration detection unit in the multi-dimensional state space, satisfactory vibration waveform prediction results could not often be obtained depending on the nature of the time series output waveform, thus disturbing high-precision vibration reduction.

In view of this problem, according to the second aspect of the present invention, there is provided a reduction device comprising a vibration detection unit for detecting a nonlinear vibration of an optical axis in an image taking optical system of an image taking apparatus, a vibration reduction drive unit for moving some or all components of the image taking optical system relative to an image taking frame of the image taking apparatus, and a vibration reduction control unit for setting a calculation coefficient on the basis of an amplitude and/or a cycle of time series detection outputs from the vibration detection unit, reconstructing an attractor by embedding the time series detection outputs in a multidimensional state space using the calculation coefficient, predicting a waveform of the vibration on the basis of data vectors of the reconstructed attractor, and driving the vibration reduction drive unit on the basis of a result of the prediction.

According to one mode of the present invention, in this vibration reduction apparatus, the calculation coefficient may include a delay time and an embedding dimension, the delay time may be determined on the basis of an average cycle of the time series detection outputs in a predetermined period of time, and the embedding dimension may be determined on the basis of a maximum amplitude of the time series detection outputs in the predetermined period of time.

Furthermore, in this vibration reduction device, upon reconstruction of the attractor, the components of a vector to be predicted may be calculated by calculating weighted means using, as weighting coefficients, values corresponding to distances from neighboring vectors to the latest vector in units of components.

DETAILED DESCRIPTION OF THE PREFERRED EMBODIMENTS

The preferred embodiments of the present invention will be described in more detail hereinafter with reference to the accompanying drawings.

Figure 1:
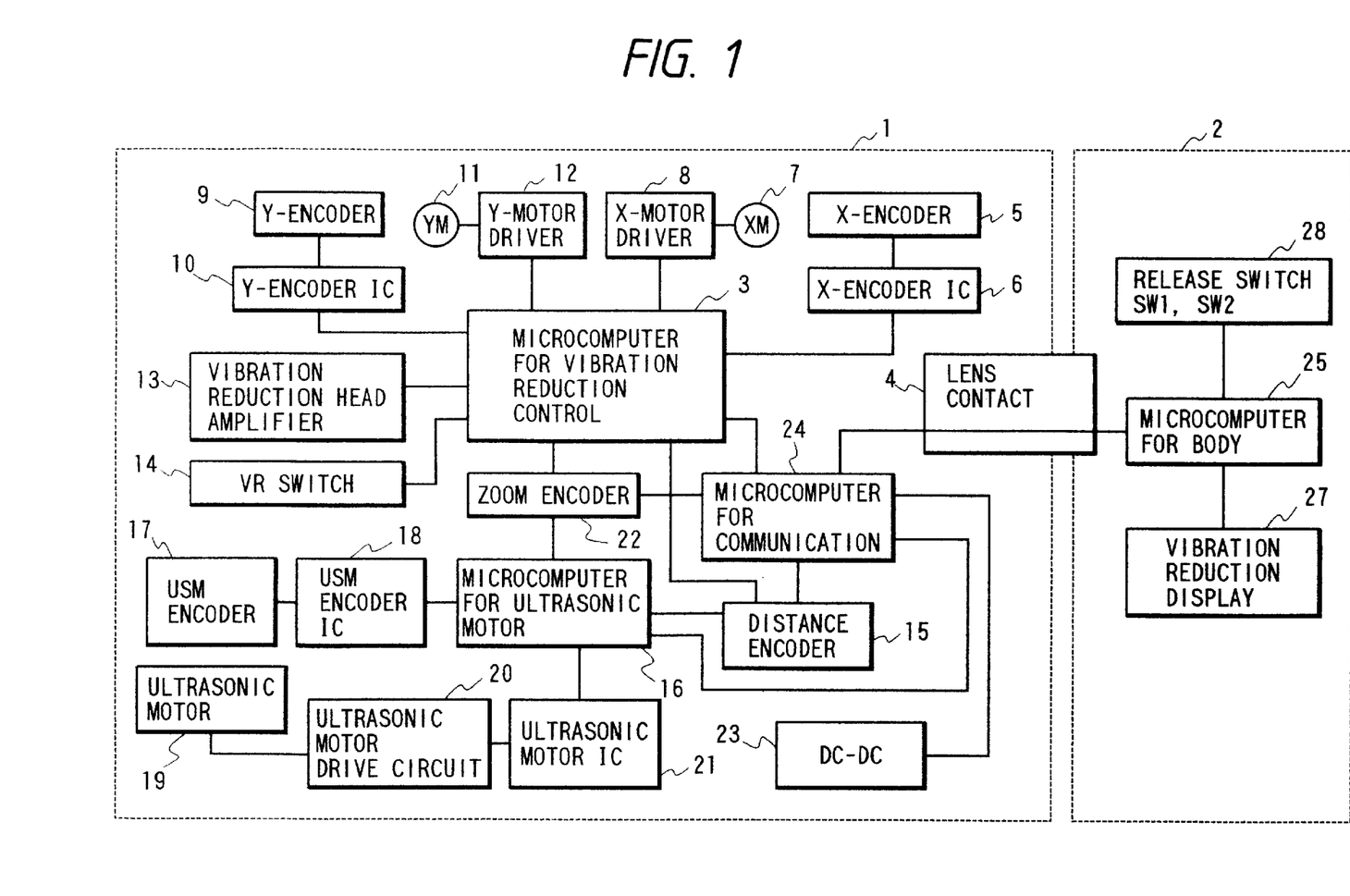
FIG. 1 is a block diagram showing the first embodiment of a vibration reduction device according to the present invention.
Figure 3:
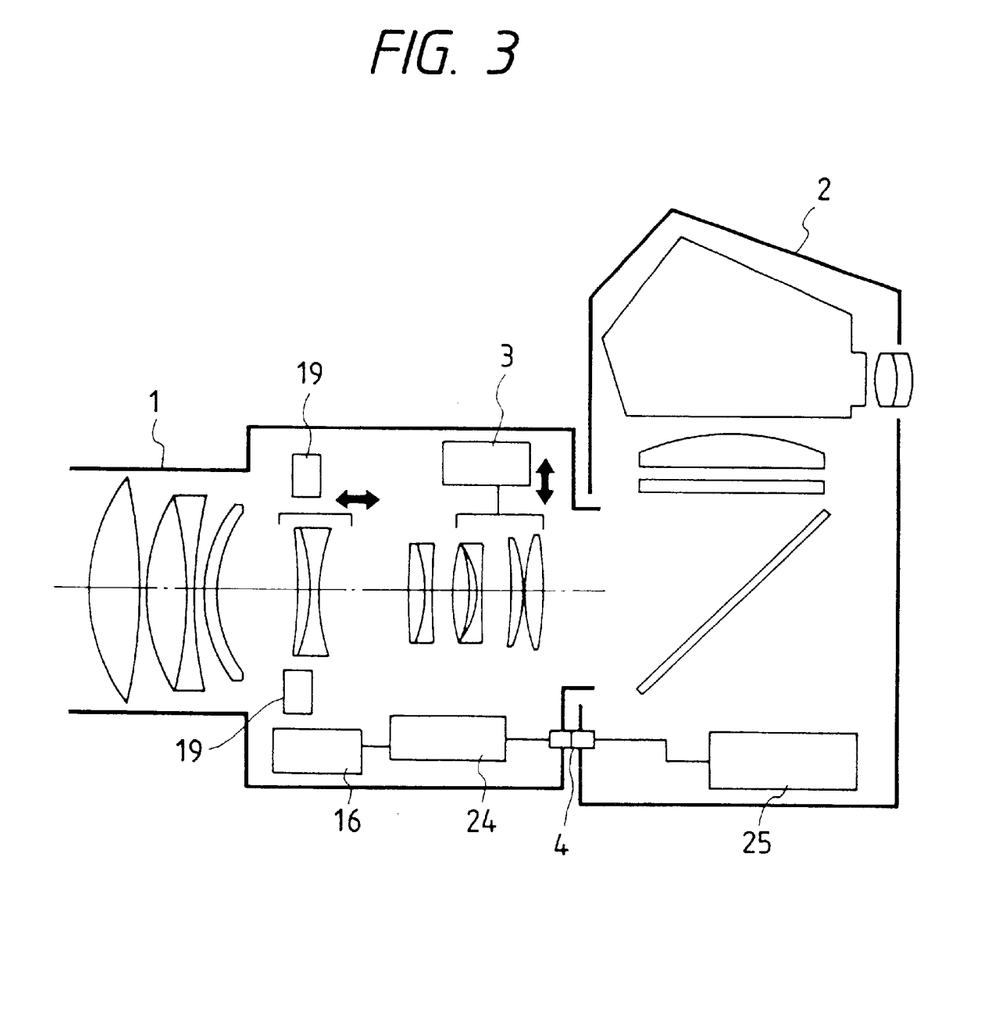
FIG. 3 is a schematic sectional view showing the arrangement of a camera which comprises the vibration reduction device of the first embodiment.

FIG. 1 is a block diagram showing the first embodiment of a vibration reduction device according to the present invention, and FIG. 3 is a schematic sectional view showing the arrangement of a camera which comprises the vibration reduction device of this embodiment.

This vibration reduction device is built in an image taking apparatus (see FIG. 3) constituted by a lens device 1 and a body device 2, and shifts some components of an image taking optical system on the basis of the detection value of the vibration amount of the optical axis in the image taking optical system. The lens device 1 includes a microcomputer 3 for vibration reduction control, a microcomputer 16 for an ultrasonic motor, a microcomputer 24 for a communication, and the like, and the body device 2 includes a microcomputer 25 for a body, and the like. In this embodiment, a vibration reduction control unit of the present invention is constituted by combining these microcomputers.

The microcomputer 3 for vibration reduction control controls the drive operation of a vibration reduction drive unit constituted by an X-motor 7, an X-motor driver 8, a Y-motor 11, a Y-motor driver 12, and the like on the basis of the output from the microcomputer 25 for a body in the body device 2 and optical system position information from an X-encoder 5, a Y-encoder 9, a distance encoder 15, a zoom encoder 22, and the like.

A lens contact 4 includes electrical contacts used for exchanging signals between the lens device 1 and the body device 2, and is connected to the microcomputer 24 for communication.

The X-encoder 5 is used for detecting the moving amount, in the X-direction, of the optical system, and its output is connected to an X-encoder IC 6. The X-encoder IC 6 converts the moving amount, in the X-direction, of the optical system into an electrical signal, which is supplied to the microcomputer 3 for vibration reduction control. Furthermore, the X-motor 7 is a drive motor for shifting an X-vibration reduction optical system, and the X-motor driver 8 is a circuit for driving the X-motor 7.

Likewise, the Y-encoder 9 is used for detecting the moving amount, in the Y-direction, of the optical system, and its output is connected to an Y-encoder IC 10. The Y-encoder IC 10 converts the moving amount, in the Y-direction, of the optical system into an electrical signal, which is supplied to the microcomputer 3 for vibration reduction control. Furthermore, the Y-motor 11 is a drive motor for shifting a Y-vibration reduction optical system, and the Y-motor driver 12 is a circuit for driving the Y-motor 11.

A vibration reduction head amplifier 13 is a circuit for detecting the vibration amount, and converts image vibration information into an electrical signal. The electrical signal is supplied to the microcomputer 3 for vibration reduction control. As the vibration reduction head amplifier 13, for example, an angular velocity sensor or the like can be used.

A VR switch 14 is a switch for turning on/off the vibration reduction drive operation, and for switching the vibration reduction mode between vibration reduction modes 1 and 2. For example, vibration reduction mode 1 is a mode for performing coarse control upon reducing vibrations of a finder image before an image taking preparation start operation, and vibration reduction mode 2 is a mode for performing precision control upon reducing vibrations under actual exposure.

The distance encoder 15 is an encoder for detecting the focus position and converting it into an electrical signal, and its output is connected to the microcomputer 3 for vibration reduction control, the microcomputer 16 for an ultrasonic motor, and the microcomputer 24 for a communication.

The microcomputer 16 for an ultrasonic motor is used for controlling an ultrasonic motor 19 that drives a focusing optical system drive unit.

A USM encoder 17 is an encoder for detecting the moving amount of the ultrasonic motor 19, and its output is connected to a USM encoder IC 18. The USM encoder IC 18 is a circuit for converting the moving amount of the ultrasonic motor 19 into an electrical signal, which is supplied to the microcomputer 16 for an ultrasonic motor.

The ultrasonic motor 19 is a motor for driving a focusing optical system. An ultrasonic motor drive circuit 20 is a circuit for generating two drive signals having a drive frequency inherent to the ultrasonic motor 19 and a 90°—phase difference therebetween. An ultrasonic motor IC 21 is a circuit for interfacing between the microcomputer 16 for an ultrasonic motor and the ultrasonic motor drive circuit 20.

The lens device 1 of this embodiment is a zoom lens with a variable focal length, and the zoom encoder 22 detects the lens focal length position and converts it into an electrical signal. The output from the zoom encoder 22 is connected to the microcomputer 3 for vibration reduction control, the microcomputer 16 for an ultrasonic motor, and the microcomputer 24 for communication.

A DC-DC converter 23 is a circuit for supplying a stable DC voltage against battery voltage variations, and is controlled by a signal supplied from the microcomputer 24 for communication.

The microcomputer 24 for communication performs communications between the lens device 1 and the body device 2, and sends commands to other microcomputers (the microcomputer 3 for vibration reduction control, the microcomputer 16 for an ultrasonic motor, and the like) in the lens device 1.

The microcomputer 25 for a body instructs a vibration reduction display 27 to display a vibration warning message on the basis of maximum vibration reduction time information, exposure setting information, object luminance information, and the like supplied from the lens device 1, as needed.

A release switch 28 is arranged on the body device 2. With this switch, the user of the image taking apparatus informs the body device 2 of the start of exposure control, and determines the supply timing of a vibration reduction control signal. Note that the release switch 28 is constituted by a half-stroke switch SW1 that starts an image taking preparation operation when the user of the image taking apparatus presses the release button to the half-stroke position, and a full-stroke switch SW2 which instructs the start of exposure control when the user presses the release button to the full-stroke position.

The camera with the vibration reduction mechanism of this embodiment has the above-mentioned arrangement.

Figure 2:
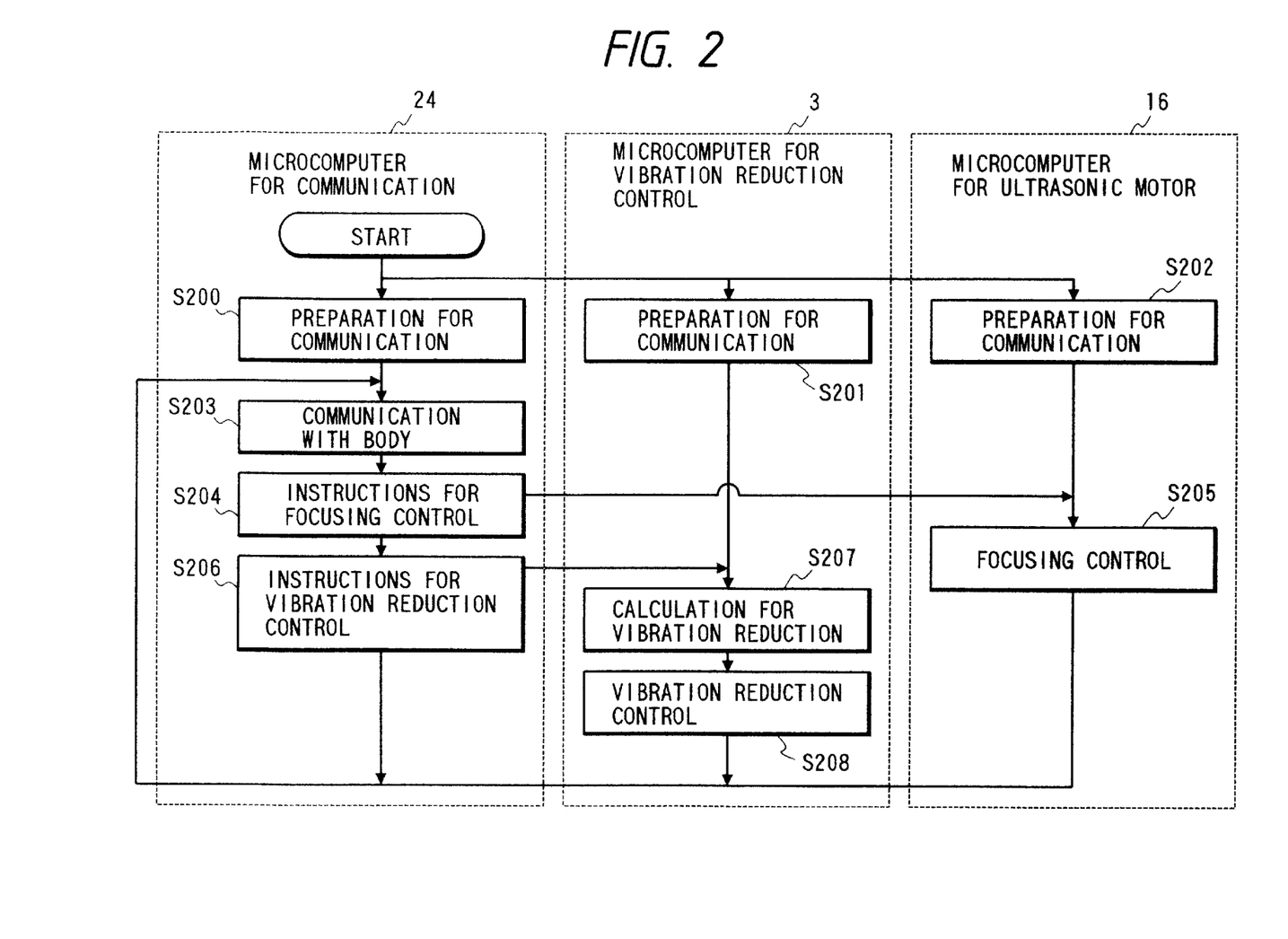
FIG. 2 is a flow chart for explaining the operation order of an image taking apparatus according to the first embodiment.

FIG. 2 is a flow chart for explaining the operation order of the image taking apparatus according to this embodiment.

In step (to be abbreviated as "S" hereinafter) 200, the microcomputer 24 for communication performs preparation for communication. At the same time, the microcomputer 3 for vibration reduction control performs preparation for a communication in S201, and the microcomputer 16 performs preparation for communication in S202.

In S203, the microcomputer 24 for communication communicates with the body device 2 via the lens contact 4.

In S204, instructions for focusing control received from the body device 2 are supplied to the microcomputer 16 for an ultrasonic motor.

In S205, the microcomputer 16 for an ultrasonic motor performs focusing control on the basis of information supplied from the zoom encoder 22, the distance encoder 15, and the like.

In S206, a vibration reduction control command is sent from the body device 2 to the microcomputer 3 for vibration reduction control.

In S207, the microcomputer 3 for vibration reduction control performs a calculation for vibration reduction.

In S208, the microcomputer 3 for vibration reduction control performs vibration reduction control.

Figure 4:
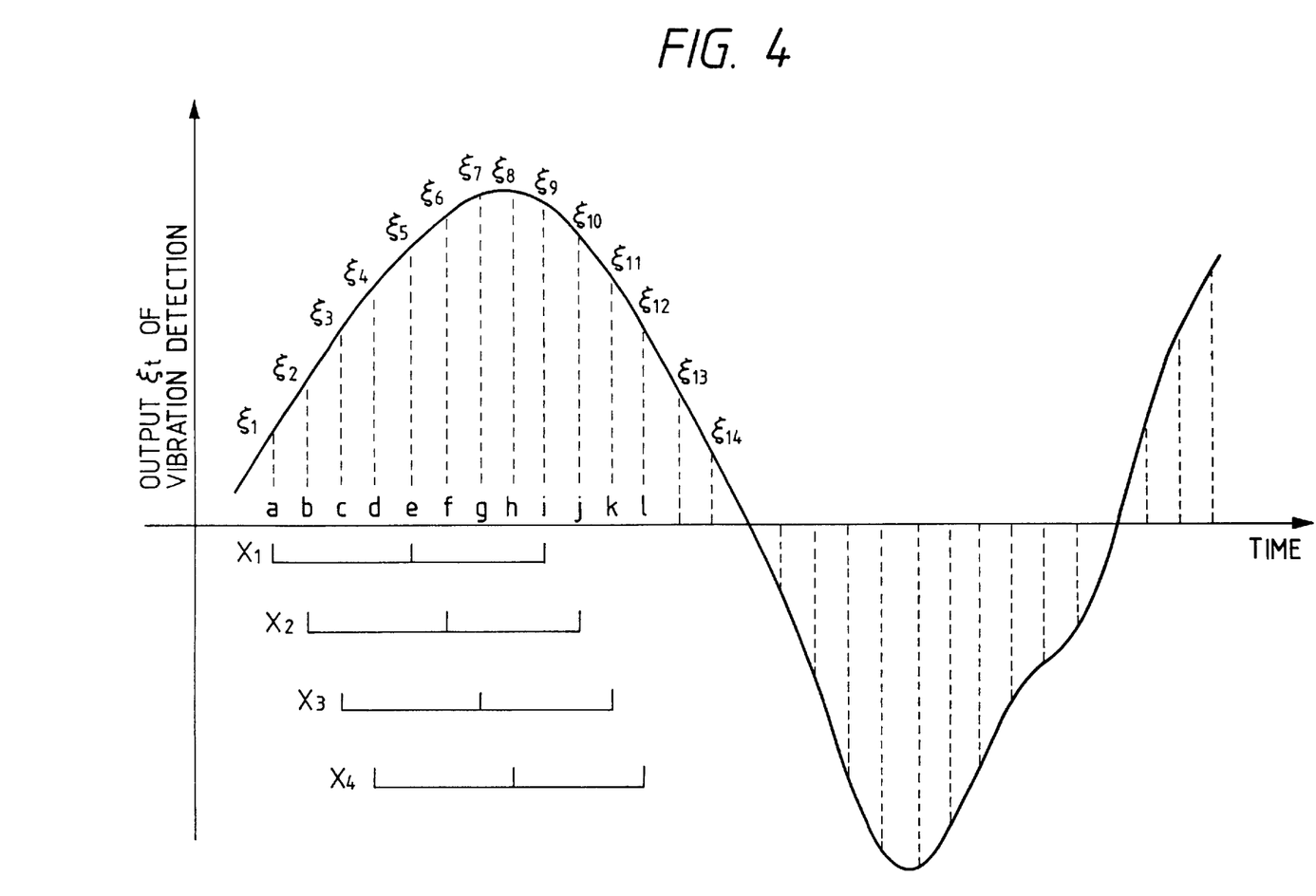
FIG. 4 is a graph of until the vibration sensor outputs according to the first embodiment when they are taken as time series data that behave chaotically and three-dimensional vectors are generated.

FIG. 4 is a graph of until the outputs from the vibration reduction head amplifier (vibration sensor) 13 of this embodiment when they are taken as time series data that behave chaotically, and three-dimensional vectors are generated.

Referring to FIG. 4, the time series detection outputs from the vibration reduction head amplifier 13 are defined as follows:

$$\xi_1, \xi_2, \xi_3, \ldots, \xi_t, \ldots$$

From the time series detection outputs $\xi_t$, the following n-dimensional vector is generated in an n-dimensional reconstructed state space using the duration, $\tau$, of a predetermined time delay. This embodiment exemplifies vectors obtained when the dimension is set to be n=3.

$$X1=(\xi_1, \xi_{1+\tau}, \xi_{1+2\tau})$$

$$X2=(\xi_2, \xi_{2+\tau}, \xi_{2+2\tau})$$

$$X3=(\xi_3, \xi_{3+\tau}, \xi_{3+2\tau})$$

. . . . . . . . . .

$$Xt=(\xi_t, \xi_{t+\tau}, \xi_{t+2\tau})$$

. . . . . . . . . .

Assuming that $\tau=4$, and an output $\xi_1$ at a point a for vector X1 is used as a reference component, the remaining components of vector X1 are defined by an output $\xi_5$, at a point e delay time $\tau=4$ later, and an output $\xi_9$ at a point i delay time $2\tau$ later. The components of vector X2 after an elapse of a unit time are defined by an output $\xi_6$ at a point f delay time $\tau=4$ later, and an output $\xi_{10}$ at a point j delay time $2\tau$ later. The same applies to vector X3 after an elapse of another unit time, and the vectors are defined as follows:

$$X1=(\xi_1, \xi_5, \xi_9)$$

$$X2=(\xi_2, \xi_6, \xi_{10})$$

$$X3=(\xi_3, \xi_7, \xi_{11})$$

. . . . . . . . . .

$$Xt=(\xi_t, \xi_{t+4}, \xi_{t+8})$$

Note that both the dimension n and the delay time $\tau$ are fixed values determined as optimal values by experiments.

Figure 5:
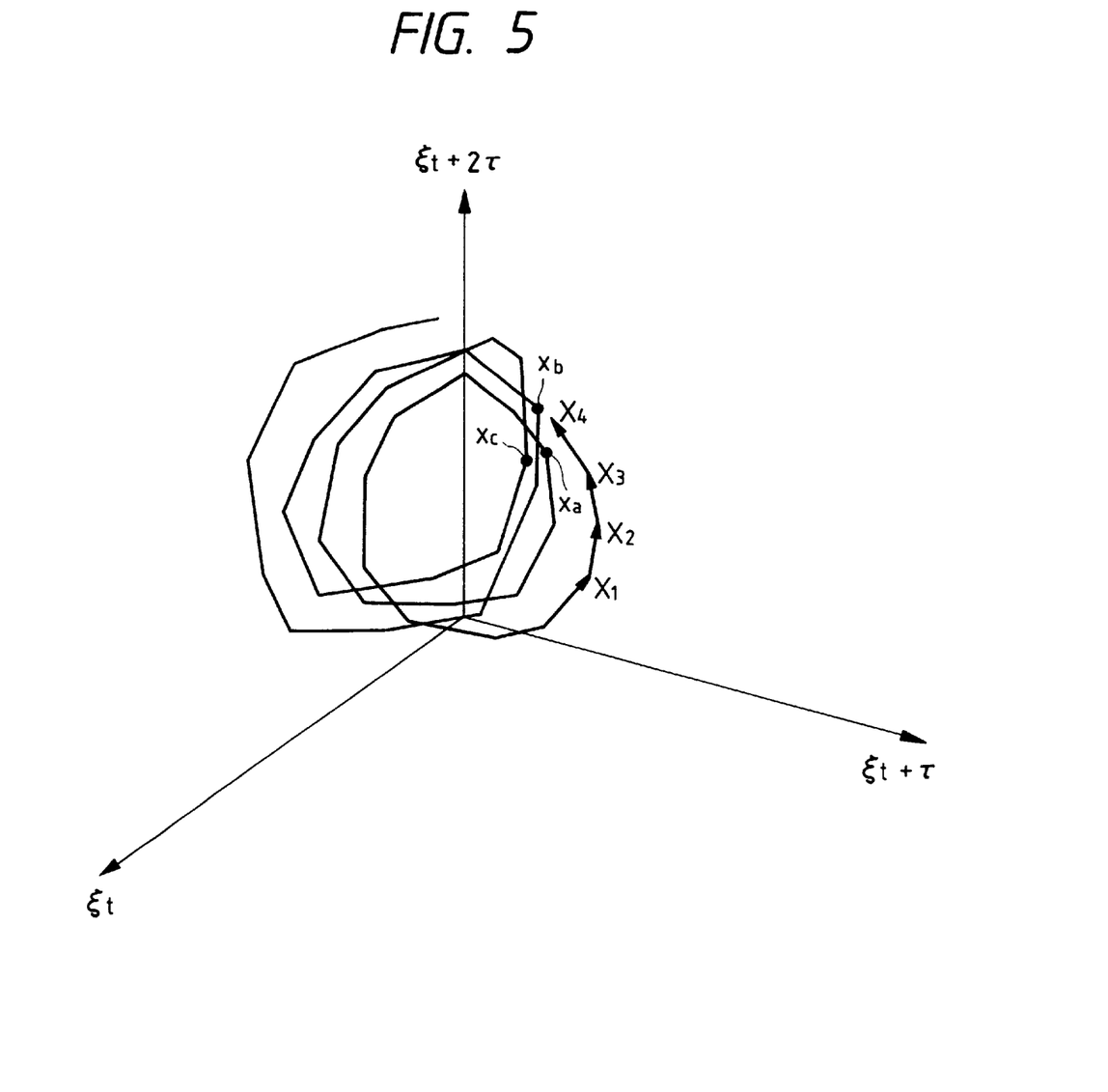
FIG. 5 is a graph showing the loci of successive vectors obtained by reconstructing an attractor by embedding divided three-dimensional data shown in FIG. 4 according to the first embodiment in a three-dimensional state space.

FIG. 5 is a view that two-dimensionally projects the loci, in a multi-dimensional space, of the vectors of an attractor obtained by embedding continuous data in the multi-dimensional space on the basis of the Takens embedding theorem. FIG. 5 reveals that the attractor has certain regularity.

An example of the way of predicting, e.g., time series detection outputs X4 one step ahead will be described below with reference to FIG. 5.

Denoting the vectors on a reconstructed attractor as Xt, the Euclidean distances between all the vectors in the attractor and X4 are calculated, and m closest vectors are selected.

Note that the value m is set to equal the value of the dimension n, Xa, Xb, and Xc respectively represent the vectors from the closest one in turn, and $d_1$, $d_2$, and $d_3$ respectively represent the distances between X4 and Xa, Xb, and Xc.

X'a, X'b, and X'c respectively represent the vectors one step ahead of the vectors Xa, Xb, and Xc, and their components are expressed as follows.

$$X'a=(\xi_{a1}, \xi_{a2}, \xi_{a3})$$

$$X'b=(\xi_{b1}, \xi_{b2}, \xi_{b3})$$

$$X'c=(\xi_{c1}, \xi_{c2}, \xi_{c3})$$

At this time, vector $X5=(\xi_{x1}, \xi_{x2}, \xi_{x3})$ predicted one step ahead of X4 is calculated as follows as a weighted mean of the vectors X'a, X'b, and X'c that are weighted with the reciprocals of the distances $d_1$, $d_2$, and $d_3$ between the vectors Xa, Xb, and Xc, and the vector X4:

$$X5 = \frac{(X'a/d_1 + X'b/d_2 + X'c/d_3)}{(1/d_1 + 1/d_2 + 1/d_3)}$$

Vector X5 can be expressed by its components as follows:

$$\xi_{xi} = \frac{(\xi_{ai}/d_1 + \xi_{bi}/d_2 + \xi_{ci}/d_3)}{(1/d_1 + 1/d_2 + 1/d_3)}$$

The third component $\xi_{x3}$ of X5 is given by the following equation, and serves as a predicted value one step ahead of the time series output waveform:

$$\xi_{x3} = \frac{(\xi_{a3}/d_1 + \xi_{b3}/d_2 + \xi_{c3}/d_3)}{(1/d_1 + 1/d_2 + 1/d_3)}$$

Based on the prediction result, a vibration reduction drive duty D is calculated using the following equation (V is the amplifier output voltage), and the vibration reduction drive unit is driven by this vibration reduction drive duty D:

$D=K1\times V+K2\times\int Vdt+K3\times dV/dt+K4\times\xi_{x3}$ where K1, K2, K3, and K4 are fixed values determined in advance as optimal values by experiments or an adjustment device.

As described above, according to this embodiment, the detection outputs from the vibration detection unit are taken as time series data that behave chaotically, and an attractor is reconstructed by embedding the time series detection outputs from the vibration detection unit in a multi-dimensional state space. Based on the data vectors of the reconstructed attractor, short-term prediction of the time series output waveform is performed, and a vibration reduction signal of the vibration reduction drive unit is generated on the basis of the short-term prediction result and the vibration detection outputs so as to control the vibration reduction device. With this control, a phase lag due to the delay time from generation of actual vibrations until execution of vibration reduction control can be compensated for with high precision in a broad vibration frequency region, thus attaining high-precision vibration reduction.

Furthermore, in this embodiment, since the components of a vector to be expected are calculated by calculating the weighted means using, as weighting coefficients, values inversely proportional to the distances from neighboring vectors to the current or latest vectors, in units of components, thus realizing vibration reduction with higher precision.

The second embodiment of the present invention will be described below. In the second embodiment as well, a vibration reduction device built in a camera constituted by a lens device and a body device will be exemplified as in the first embodiment. Since the arrangement of the device of the second embodiment is the same as that shown in FIGS. 1 and 3 described above in association with the first embodiment, and the operation of the image taking apparatus is the same as that of the first embodiment described above with reference to FIG. 2, a detailed description thereof will be omitted. The second embodiment is different from the first embodiment in that three-dimensional vectors are generated on the basis of the outputs from the vibration reduction head amplifier 13. In other words, the second embodiment corresponds to a modification of the way of generating three-dimensional vectors in the first embodiment.

Figure 6:
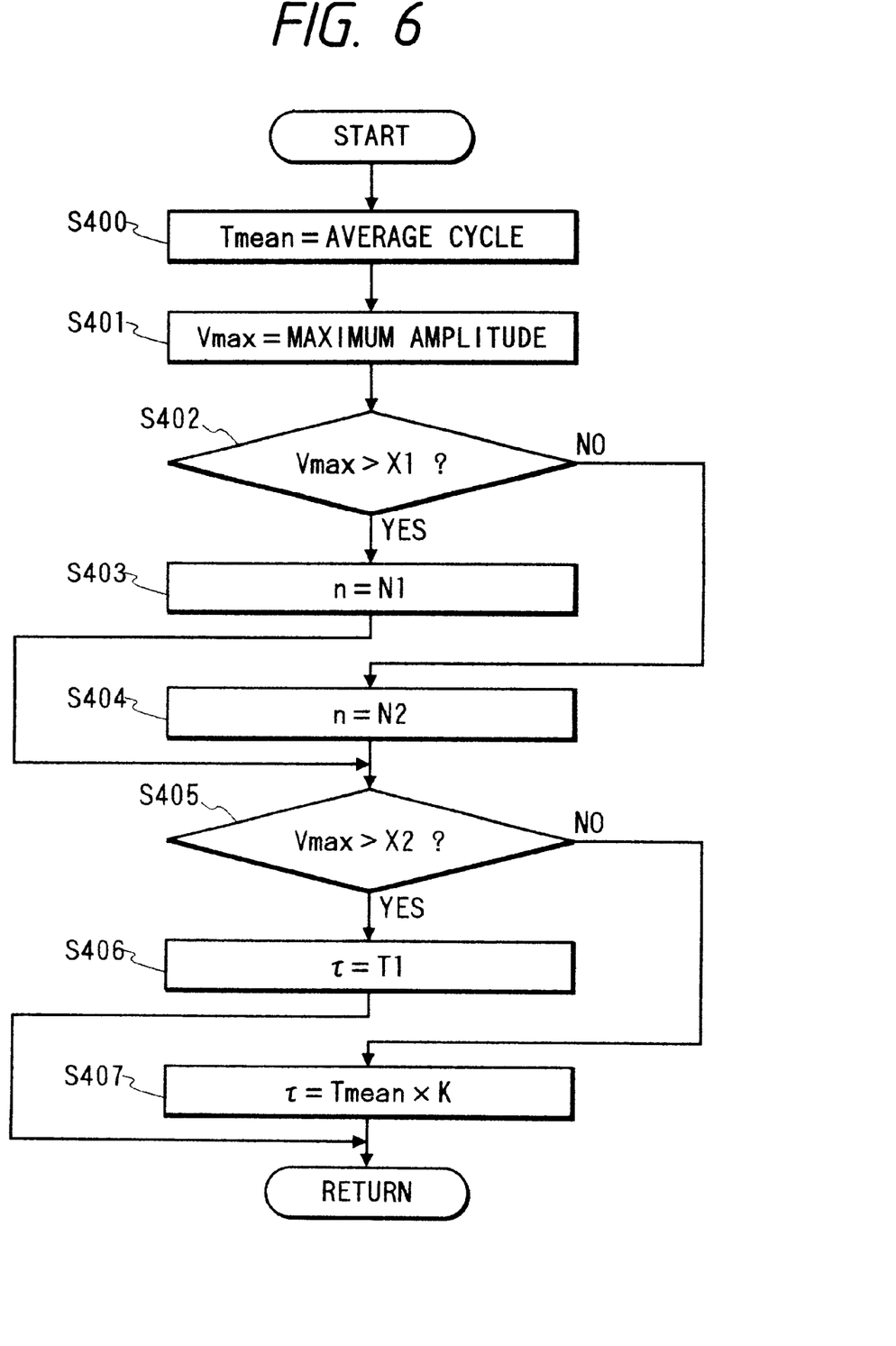
FIG. 6 is a flow chart for explaining the determination order of a delay time τ and an embedding dimension n used for predicting the vibration waveform according to the second embodiment of the present invention.

FIG. 6 is a flow chart for explaining the determination order of the delay time τ and the embedding dimension n for vibration waveform prediction according to this embodiment.

In S400, the average cycle of the vibration detection output waveform in a predetermined period of time is calculated, and is stored in Tmean.

In S401, the maximum amplitude (or maximum vibration) of the vibration detection output waveform in a predetermined period of time is stored in Vmax.

In S402, it is checked if the maximum amplitude Vmax stored in S401 is larger than a predetermined fixed value X1. If the maximum amplitude Vmax is larger than the fixed value X1, the flow advances to S403. On the other hand, if the maximum amplitude Vmax is equal to or smaller than the fixed value X1, the flow advances to step S404.

In S403, a predetermined fixed value N1 is stored in the embedding dimension n.

In S404, a predetermined fixed value N2 is stored in the embedding dimension n.

In S405, it is checked if the average cycle Tmean of the vibration detection output waveform stored in S400 is larger than a predetermined fixed value X2. If the average cycle Tmean is larger than the fixed value X2, the flow advances to S406. On the other hand, if the average cycle Tmean is equal to or smaller than the fixed value X2, the flow advances to S407.

In S406, a predetermined fixed value T1 is stored in the delay time τ.

In S407, the product (Tmean×K) of the average cycle Tmean and a predetermined fixed value K is stored in the delay time τ.

In this manner, the calculation coefficients (embedding dimension n and delay time τ) are determined on the basis of the amplitude and cycle of the time series detection outputs from the vibration reduction head amplifier 13 as the vibration detection unit.

Figure 7:
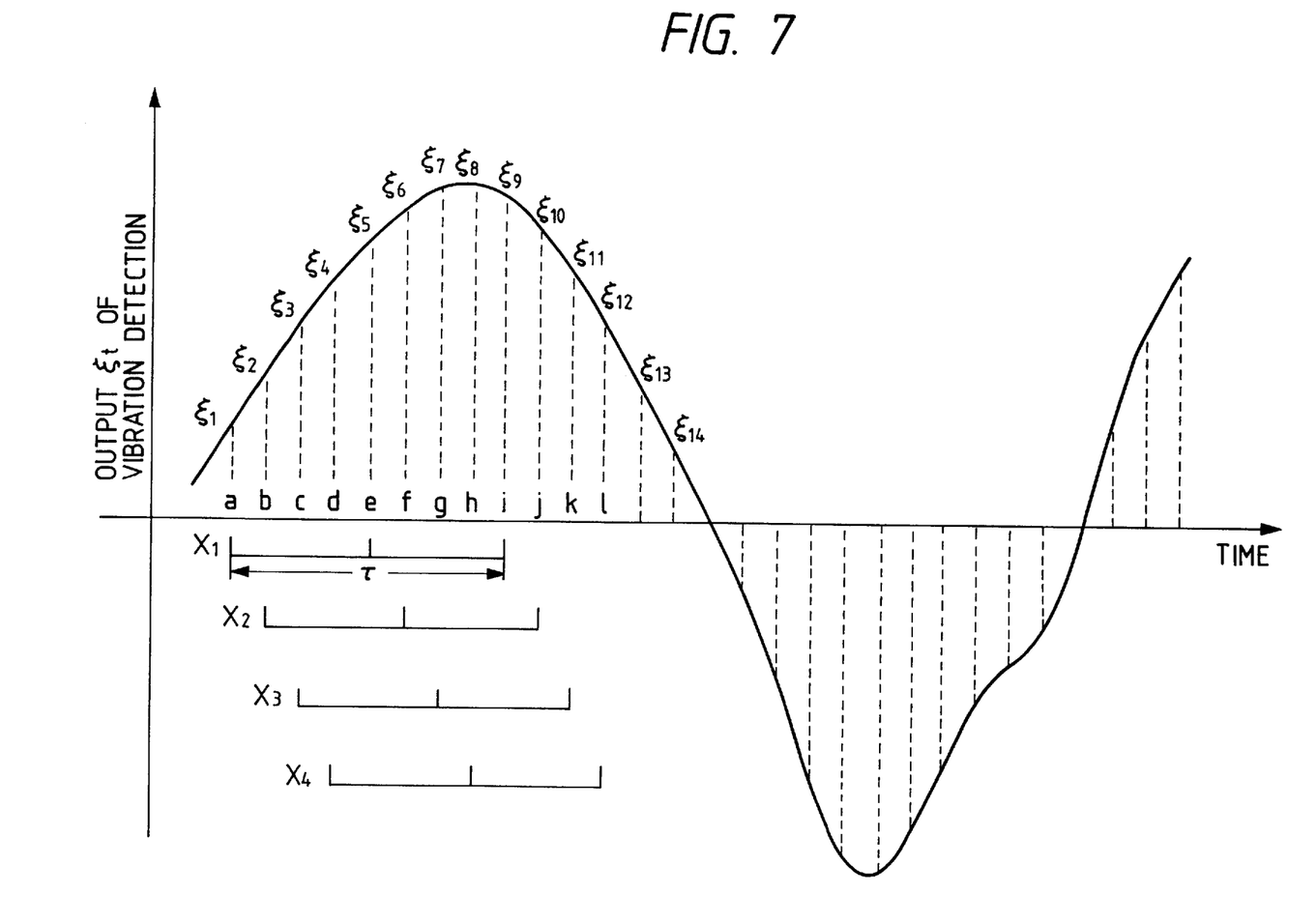
FIG. 7 is a graph of until the detection outputs from a vibration reduction head amplifier of the second embodiment according to the second embodiment when they are taken as time series data that behave chaotically and three-dimensional vectors are generated.

FIG. 7 is a graph of until the outputs from the vibration reduction head amplifier of this embodiment when they are taken as time series data that behave chaotically, and three-dimensional vectors are generated.

As shown in FIG. 7, the time series detection output data from the vibration reduction head amplifier 13 as the vibration detection unit are defined as follows:

$\xi_1, \xi_2, \mu_3, \ldots, \mu_t, \ldots$

From the time series detection output data $\xi_t$, the following n-dimensional vector is generated in an n-dimensional reconstructed state space using the duration, τ, of a predetermined time delay. This embodiment exemplifies vectors obtained when the dimension is set to be n=3, for the sake of easy understanding.

$X1 = (\xi_1, \xi_{1+\tau}, \xi_{1+2\tau})$ $X2 = (\xi_2, \xi_{2+\tau}, \xi_{2+2\tau})$ $X3 = (\xi_3, \xi_{3+\tau}, \xi_{3+2\tau})$

. . . . . . . . . .

$Xt = (\xi_t, \xi_{t+\tau}, \xi_{t+2\tau})$

. . . . . . . . . .

Assuming that τ=4, and an output $\xi_1$ at a point a for vector X1 is used as a reference component, the remaining components of vector X1 are defined by an output $\xi_5$ at a point e delay time τ=4 later, and an output $\xi_9$ at a point i delay time 2τ later. Vector X2 after an elapse of a unit time are defined by an output $\xi_6$ at a point f delay time τ=4 later, and an output $\xi_{10}$ at a point j delay time 2τ later.

Furthermore, the same applies to vector X3 after an elapse of another unit time, and the above-mentioned vectors are rewritten as follows:

$X1 = (\xi_1, \xi_5, \xi_9)$ $X2 = (\xi_2, \xi_6, \xi_{10})$ $X3 = (\xi_3, \xi_7, \xi_{11})$

. . . . . . . . . .

$Xt = (\xi_t, \xi_{t+4}, \xi_{t+8})$

. . . . . . . . . .

Figure 8:
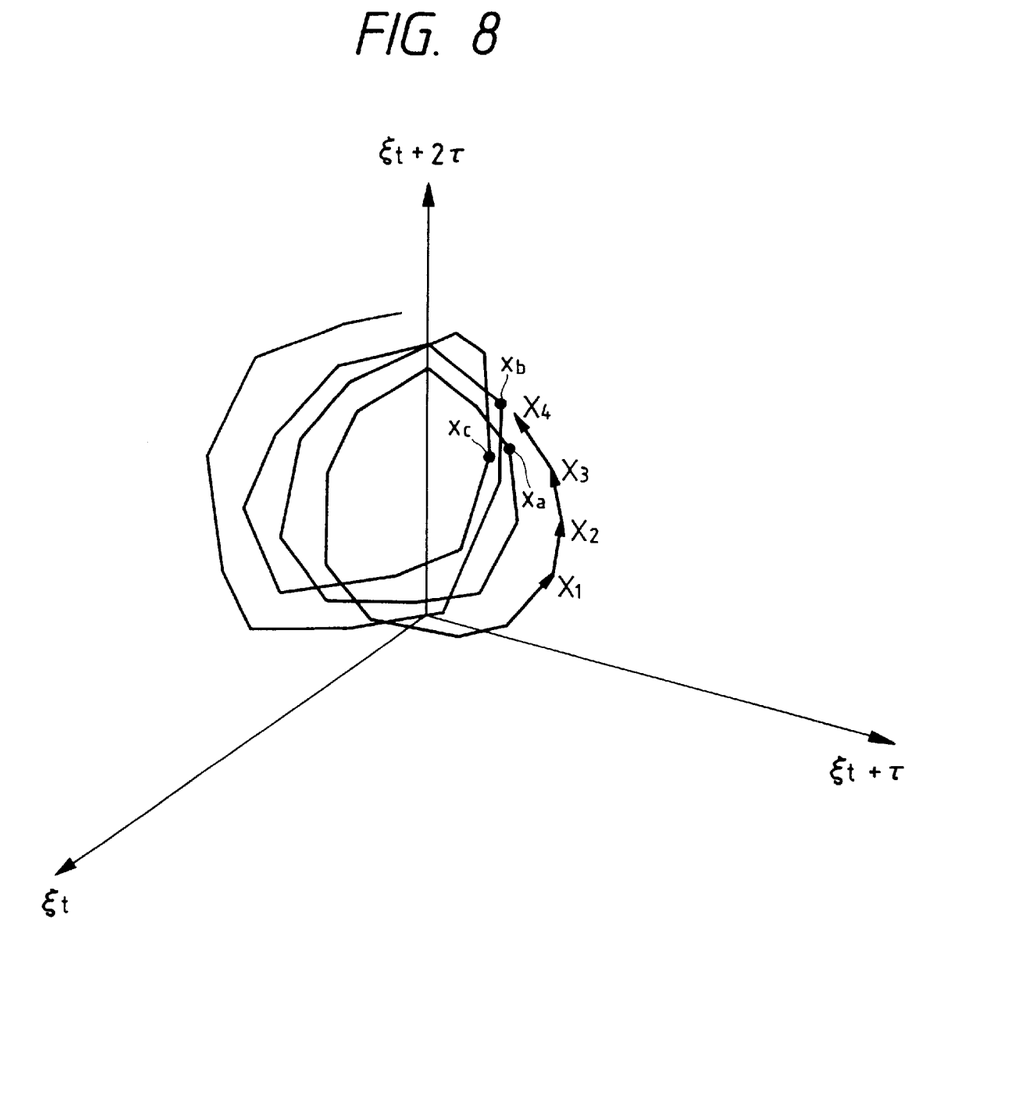
FIG. 8 is a graph showing the loci of successive vectors obtained by reconstructing an attractor by embedding divided three-dimensional data in a three-dimensional state space in the second embodiment.

FIG. 8 is a graph that two-dimensionally projects the loci, in a multi-dimensional space, of the vectors of an attractor obtained by embedding continuous data in the multi-dimensional space on the basis of the Takens embedding theorem. FIG. 8 indicates that the attractor has certain regularity.

The detection outputs one step ahead of the time series detection outputs X4 in FIG. 8 are predicted in the following procedure.

Taking the vectors on a reconstructed attractor as Xt, the Euclidean distances between all the vectors in the attractor and X4 are calculated, and m closest vectors are selected.

Note that the value m is set to equal the value of the dimension n, Xa, Xb, and Xc respectively represent vectors from the closest one in turn, and $d_1$, $d_2$, and $d_3$ respectively represent the distances between X4 and Xa, Xb, and Xc.

X'a, X'b, and X'c respectively represent the vectors one step ahead of the vectors Xa, Xb, and Xc, and their components are expressed as follows.

$X'a = (\xi_{a1}, \xi_{a2}, \xi_{a3})$ $X'b = (\xi_{b1}, \xi_{b2}, \xi_{b3})$ $X'c = (\xi_{c1}, \xi_{c2}, \xi_{c3})$

At this time, vector $X5 = (\xi_{x1}, \xi_{x2}, \xi_{x3})$ predicted one step ahead of X4 is calculated as follows as a weighted mean of the vectors X'a, X'b, and X'c that are weighted with the reciprocals of the distances $d_1$, $d_2$, and $d_3$ between the vectors Xa, Xb, and Xc, and the vector X4:

$$X5 = \frac{(X'a/d_1 + X'b/d_2 + X'c/d_3)}{(1/d_1 + 1/d_2 + 1/d_3)}$$

Vector X5 can be expressed by its components as follows:

$$\xi_{xi} = \frac{(\xi_{ai}/d_1 + \xi_{bi}/d_2 + \xi_{ci}/d_3)}{(1/d_1 + 1/d_2 + 1/d_3)}$$

The third component $\xi_{x3}$ of X5, for example, is given by the following equation, and serves as a predicted value one step ahead of the time series output waveform:

$$\xi_{x3} = \frac{(\xi_{a3}/d_1 + \xi_{b3}/d_2 + \xi_{c3}/d_3)}{(1/d_1 + 1/d_2 + 1/d_3)}$$

In this manner, the waveform of the time series detection outputs is predicted on the basis of the data vectors of the reconstructed attractor.

Based on the prediction result, if a vibration reduction drive duty D is set to be an amplifier output voltage V, the amplifier output voltage V of the vibration reduction drive unit described above is calculated using the following equation:

$D = K1 \times V + K2 \times \int V dt + K3 \times dV/dt + K4 \times \xi_{x3}$ where K1, K2, K3, and K4 are fixed values determined in advance as optimal values by experiments or an adjustment device.

As described above, according to this embodiment, the detection outputs from the vibration detection unit are taken as time series data that itinerate chaotically, and the nature of the vibration waveform is discriminated on the basis of the output waveform amplitude and cycle of the vibration detection unit so as to determine the embedding dimension n and the delay time τ used in the attractor reconstruction method. Using the determined embedding dimension n and the delay time τ, an attractor is reconstructed by embedding the time series detection outputs from the vibration detection unit in a multi-dimensional state space. Based on the data vectors of the reconstructed attractor, short-term prediction of the time series output waveform is performed, and a vibration reduction signal of the vibration reduction drive unit is generated on the basis of the short-term prediction result and the vibration detection outputs so as to control the vibration reduction device, thus attaining high-precision vibration reduction.

According to this embodiment, unlike in the vibration reduction device proposed by Japanese Patent Application No. 7-229006, the average cycle of the output waveform from the vibration detection unit in a predetermined period of time is used for determining the delay time τ, and the maximum amplitude of the output waveform from the vibration detection unit in a predetermined period of time is used for determining the embedding dimension n. For this reason, the prediction calculations of vibration reduction control can be realized with high precision and in a short period of time.

The present invention is not limited to the above-mentioned first and second embodiments, and various modifications and changes may be made, which are incorporated in the present invention. For example, in the above embodiments, the present invention is applied to a lens device of a single-lens reflex camera in which the lens device is detachable from the body device. However, the present invention may be applied to a lens portion of a compact camera in place of the single-lens reflex camera.

The vibration reduction device in each of the above embodiments moves some components of the image taking optical system using X- and Y-motors. However, the vibration reduction device of the present invention is not limited to such mode. For example, the present invention may be applied to a vibration reduction device that changes the angle of a rotary or liquid prism as one component constituting the image taking optical system.

What is claimed is:

1. A vibration reduction device comprising:

a vibration detection unit to detect a nonlinear vibration of an optical axis in an image taking optical system of an image taking apparatus;

a vibration reduction drive unit to move at least some of the components of the image taking optical system relative to an image taking frame of said image taking apparatus; and a vibration reduction control unit to extract regularity from time series detection outputs from said vibration detection unit, to predict a time series output waveform of the vibration on the basis of the extracted regularity, and to drive said vibration reduction drive unit on the basis of a result of the prediction.

2. A device according to claim 1, wherein said vibration reduction control unit reconstructs an attractor by embedding the time series detection outputs in a multi-dimensional state space, and predicts the time series output waveform on the basis of data vectors of the reconstructed attractor.

3. A device according to claim 2, wherein:

at least two vectors closest to the latest vector are extracted from the data vectors of the attractor, the prediction is performed based on a weighted mean of the extracted vectors, and the weighted mean is calculated using, as weighting coefficients, values corresponding to distances between the extracted vectors and the latest vector.

4. A vibration reduction device comprising:

a vibration detection unit to detect a nonlinear vibration of an optical axis in an image taking optical system of an image taking apparatus;

a vibration reduction drive unit to move at least of the components of the image taking optical system relative to an image taking frame of said image taking apparatus; and a vibration reduction control unit to set a calculation coefficient on the basis of an amplitude and/or a cycle of time series detection outputs from said vibration detection unit, to reconstruct an attractor by embedding the time series detection outputs in a multi-dimensional state space using the calculation coefficient, to predict a waveform of the vibration on the basis of data vectors of the reconstructed attractor, and to drive said vibration reduction drive unit on the basis of a result of the prediction.

5. A device according to claim 4, wherein:

the calculation coefficient includes a delay time and an embedding dimension, the delay time is determined on the basis of an average cycle of the time series detection outputs in a predetermined period of time, and the embedding dimension is determined on the basis of a maximum amplitude of the time series detection outputs in the predetermined period of time.

6. A device according to claim 5, wherein;

at least two vectors closest to the latest vector are extracted from the data vectors of the attractor, the prediction is performed based on a weighted mean of the extracted vectors, and the weighted mean is calculated using, as weighting coefficients, values corresponding to distances between the extracted vectors and the latest vector.

7. A method for controlling a vibration reduction device, comprising:

detecting nonlinear vibrations of an axis in an optical system;

extracting regularity from time series detection outputs based on said detecting;

predicting a time series output waveform of the vibration based on the extracted regularity; and moving at least a portion of the optical system based on the prediction result.

8. A method according to claim 7, wherein said predicting comprises reconstructing an attractor by embedding the time series detection outputs in a multi-dimensional state space, and predicting the time series output waveform based on data vectors of the reconstructed attractor.

* * * * *